United States Patent
Cho et al.

(10) Patent No.: US 8,914,533 B2
(45) Date of Patent: Dec. 16, 2014

(54) APPARATUS AND METHOD FOR PROVIDING STREAMING SERVICE IN A DATA COMMUNICATION NETWORK

(75) Inventors: Seong-Ho Cho, Seoul (KR); Kyung-Mo Park, Seoul (KR)

(73) Assignee: Samsung Electronics Co., Ltd. (KR)

(*) Notice: Subject to any disclaimer, the term of this patent is extended or adjusted under 35 U.S.C. 154(b) by 254 days.

(21) Appl. No.: 13/042,121

(22) Filed: Mar. 7, 2011

(65) Prior Publication Data
US 2011/0219138 A1    Sep. 8, 2011

(30) Foreign Application Priority Data
Mar. 5, 2010  (KR) .......................... 10-2010-0020029

(51) Int. Cl.
G06F 15/16   (2006.01)
H04L 29/06   (2006.01)

(52) U.S. Cl.
CPC ........... *H04L 65/607* (2013.01); *H04L 65/1083* (2013.01); *H04L 65/4076* (2013.01)
USPC ............. 709/231; 709/232; 725/118; 725/34; 370/464

(58) Field of Classification Search
USPC ................................... 709/231, 232; 725/118
See application file for complete search history.

(56) References Cited

U.S. PATENT DOCUMENTS

| | | | |
|---|---|---|---|
| 6,460,086 B1 | 10/2002 | Swaminathan et al. | |
| 2002/0136298 A1 | 9/2002 | Anantharamu et al. | |
| 2004/0098748 A1 | 5/2004 | Bo et al. | |
| 2005/0071496 A1* | 3/2005 | Singal et al. | 709/232 |
| 2007/0091917 A1* | 4/2007 | Schoenblum | 370/464 |
| 2008/0215747 A1* | 9/2008 | Menon et al. | 709/231 |
| 2009/0319563 A1 | 12/2009 | Schnell | |
| 2010/0017839 A1* | 1/2010 | Song et al. | 725/118 |
| 2011/0060798 A1 | 3/2011 | Cho et al. | |
| 2011/0119703 A1* | 5/2011 | Schlack et al. | 725/34 |

FOREIGN PATENT DOCUMENTS

KR      1020110026215      3/2011

\* cited by examiner

*Primary Examiner* — Kyung H Shin
(74) *Attorney, Agent, or Firm* — The Farrell Law Firm, P.C.

(57) ABSTRACT

Provided is an apparatus and method for providing an adaptive streaming service based on a Moving Picture Experts Group (MPEG) file in a data communication network. An MPEG file format defined to support an adaptive streaming service between a server and a client is processed to support an adaptive streaming service between a client and a client. An MPEG file format for a particular message used in a procedure for the adaptive streaming service between the server and the client and a procedure for the adaptive streaming service between the clients is newly defined. In particular, as to the newly defined MPEG file format, necessary information for supporting the adaptive streaming service between clients is defined. As the MPEG file format, both a Transport Stream file format defined in MPEG-2 and MPEG-4 transport standards are considered.

14 Claims, 8 Drawing Sheets

APPARATUS AND METHOD FOR PROVIDING STREAMING SERVICE IN A DATA COMMUNICATION NETWORK

PRIORITY

This application claims priority under 35 U.S.C. §119(a) to a Korean Patent Application filed in the Korean Intellectual Property Office on Mar. 5, 2010, and assigned Serial No. 10-2010-0020029, the disclosure of which is incorporated herein by reference.

BACKGROUND OF THE INVENTION

1. Field of the Invention

The present invention generally relates to an apparatus and method for providing a streaming service in a data communication network and, more particularly, to an apparatus and method for providing a streaming service based on a Moving Picture Experts Group (MPEG) file format.

2. Description of the Related Art

Generally, a method of using various content services through a data communication network is roughly classified into a downloading scheme and a streaming scheme. The streaming scheme includes an adaptive streaming scheme.

Content services refer to services provided by various types of digital media data including broadcasting, movies, and music. The digital media data refers to digital information, such as audio and video, produced to correspond to contents.

The downloading scheme downloads and stores digital media data corresponding to a requested content service and uses the requested content service through the stored digital media data.

The streaming scheme receives digital media data necessary at the current point in time for a requested content service, and uses the requested content service through the received digital media data. The streaming scheme is mainly used for a content service corresponding to a real-time broadcasting material such as a long-run audiovisual material or sports relay broadcasting.

The adaptive streaming scheme, which is an example of the streaming scheme, adjusts an amount of transmission data before transmission by adjusting a quality of transmission digital media data according to a status of a data communication network.

Conventionally, an adaptive streaming service based on a Moving Picture Expert Group (MPEG) file format can be supported only between a server and a client. This is because the conventional MPEG file format has been implemented taking account only communication between a server and a client.

As a result, to exchange digital media data between a client and a client, the adaptive streaming service cannot be provided based on a conventionally defined MPEG file format.

SUMMARY OF THE INVENTION

Accordingly, an aspect of the present invention provides an apparatus and method for selectively applying a streaming service between a node and a node and a streaming service between a node and a server to transmit and receive digital media data based on an MPEG file format.

Another aspect of the present invention provides an MPEG file format for providing a streaming service of digital media data between a node and a node through a streaming scheme.

Moreover, another aspect of the present invention provides an apparatus and method for providing an adaptive streaming service through communication between a client and a client as well as communication between a server and a client based on an MPEG file format.

According to an aspect of the present invention, a method is provided for receiving digital media data in a client device. The method includes receiving digital media data corresponding to a content service requested by at least one device determined between at least one server and at least one other client device according to a condition of a data communication network using a streaming scheme based on an MPEG file format, in which the MPEG file format includes information required for the client device to receive the digital media data from the at least one other client device and to process the received digital media data.

According to another aspect of the present invention, a method is provided for transmitting digital media data to another client device in a server or a client device. The method includes transmitting, by a server or a client device determined according to a condition of a data communication network, digital media data corresponding to a content service requested by at least one other client device using a streaming scheme based on an MPEG file format, wherein the MPEG file format includes information required for the at least one other client device to receive the digital media data from the client device and process the received digital media data.

According to another aspect of the present invention, an apparatus is provided for receiving digital media data in a client device. The apparatus includes a receiver for receiving digital media data corresponding to a content service requested by at least one device determined from at least one server and at least one other client device according to a condition of a data communication network using a streaming scheme based on an MPEG file format and a media processor for processing the digital media data received by the receiver, in which the MPEG file format includes information required for the client device to receive the digital media data from the at least one other client device and to process the received digital media data.

According to another aspect of the present invention, an apparatus is provided for transmitting digital media data to another client device in a server or a client device. The apparatus includes a file generator for generating an MPEG file from digital media data corresponding to a content service requested by at least one other client device based on an MPEG file format and a transmitter for transmitting the generated MPEG file according to a streaming scheme, wherein the MPEG file format includes information required for the at least one other client device to receive the digital media data from the client device and process the received digital media data.

BRIEF DESCRIPTION OF THE DRAWINGS

The above and other features and advantages of an embodiment of the present invention will be more apparent from the following detailed description taken in conjunction with the accompanying drawings, in which.

DETAILED DESCRIPTION OF THE PREFERRED EMBODIMENTS

Hereinafter, embodiments of the present invention will be described in detail with reference to the accompanying drawings. In the following description, a detailed description of known functions and configurations incorporated herein has been omitted for clarity and conciseness. Terms used herein are defined based on functions in the present invention and may vary according to users, operators' intention or usual practices. Therefore, the definition of the terms should be made based on contents throughout the specification.

In the following embodiment of the present invention, a scheme is provided in which a Moving Picture Experts Group (MPEG) file format defined to support an adaptive streaming service between a server and a client is processed to support an adaptive streaming service between the client and another client.

To this end, initially described is a procedure performed for an adaptive streaming service between a server and a client, and a procedure performed for an adaptive streaming service between the client and another client.

An MPEG file format for a particular message used in the procedure for the adaptive streaming service between the server and the client and the procedure for the adaptive streaming service between the clients is newly defined. In particular, as to the newly defined MPEG file format, additional information necessary to support the adaptive streaming service between clients is defined. As the MPEG file format, both a Transport Stream (TS) file format defined in MPEG-2 transport standard and a file format defined in MPEG-4 transport standard will be considered.

Figure 1:
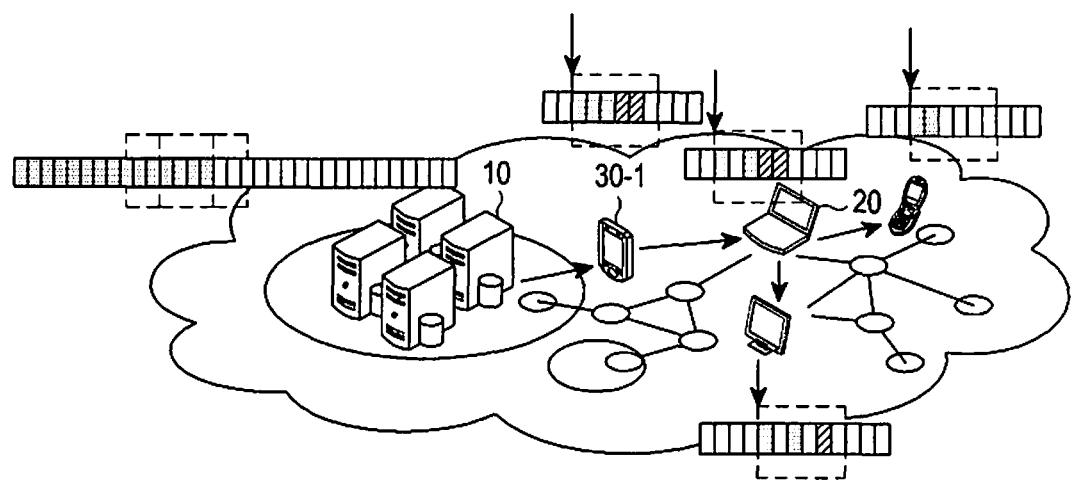
FIG. 1 illustrates a structure of a data communication network to which an embodiment of the present invention is applied.

FIG. 1 illustrates a structure of a data communication network to which an embodiment of the present invention is applied.

Referring to FIG. 1, a server 10 stores digital media content corresponding to at least one content and transmits the stored digital media data in response to a request from a client or another server. The server 10 forwards the digital media data to the client or another server by an adaptive streaming scheme based on an MPEG file format. That is, the server 10 divides the digital media data into data chunks having a predetermined size and transmits the digital media data to the client or another server in data chunk units. The server 10, when dividing the digital media data into the data chunks having the predetermined size, may consider a transfer rate that can be supported according to a condition of a network. For example, data chunks supporting high resolution are transmitted in a good network condition; and data chunks supporting low resolution are transmitted in a poor network condition.

If there is a requested content service, a client 30-1 adjacent to the server 10 transmits a request for digital media data corresponding to the requested content service to the server 10. The client 30-1 is provided with the digital media data from the server 10 through an adaptive streaming scheme based on an MPEG file format. The client 30-1 is provided with the digital media data from the server 10 in predetermined-size data chunk units. The data size may be an amount of data corresponding to a predetermined content reproduction time or a group of data chunks having a size predefined for streaming.

The client 30-1 may use in real time the digital media data provided from the server 10. That is, movie, broadcasting, and music may be provided in real time by using the digital media data provided from the server 10. The client 30-1 also stores the digital media data provided from the server 10, and forwards the stored digital media data to at least one other client 20 adjacent to the client 30-1 in response to a request of the at least one other client 20. The digital media data may be forwarded through the adaptive streaming scheme based on the MPEG file format.

Another client 20 adjacent to the client 30-1 is provided with digital media data from the client 30-1 through the adaptive streaming scheme based on the MPEG file format, and may use the provided digital media data in real time.

As can be seen from the foregoing description, an embodiment of the present invention supports an adaptive streaming service between client 30-1 and client 20, as well as an adaptive streaming service between the server 10 and client 30-1, based on the MPEG file format. The MPEG file format proposed for this end is further described below.

Figure 2:
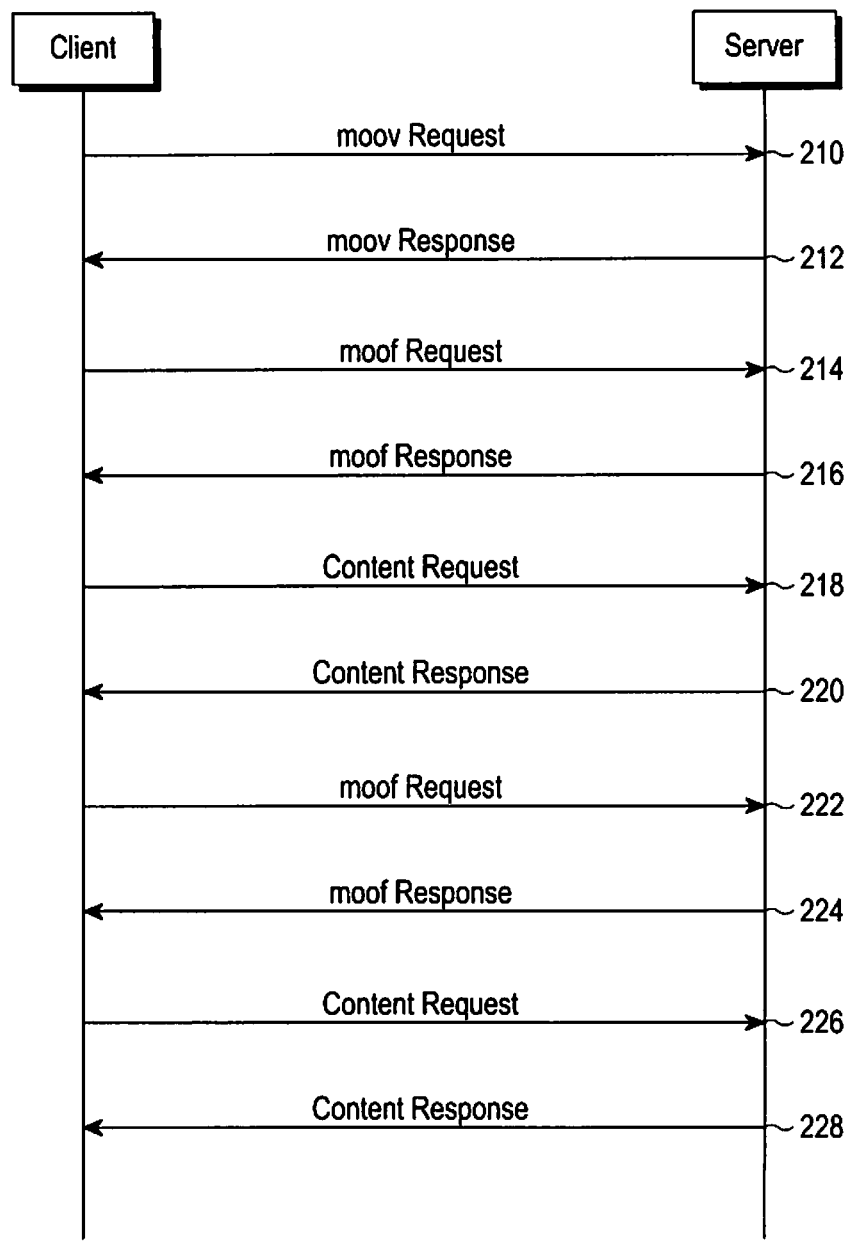
FIG. 2 shows a procedure for providing an adaptive streaming service between a server and a client based on an MPEG file format according to an embodiment of the present invention.

FIG. 2 shows a procedure for providing an adaptive streaming service between a server and a client based on an MPEG file format according to an embodiment of the present invention.

Referring to FIG. 2, a client transmits a movie metadata (moov) request message requesting metadata regarding requested content to a server in step 210. The server, upon receiving the metadata request from the client, provides a moov response message including stored metadata corresponding to the content to the client in step 212.

The client transmits a movie fragment (moof) request message requesting main metadata to the server by referring to the metadata provided from the server in step 214, and the server then provides the main metadata to the client through a moof response message in response to the request from the client in step 216. The main metadata may include information about data chunks acquired by dividing digital media data corresponding to the requested service, or information about a current broadcasting progress state.

Once the client transmits a content request message requesting the server to provide requested data chunks among the divided data chunks to the server in step 218, the server then transmits the requested data chunks to the client through a content response message in step 220.

The client and the server repeat the foregoing process in steps 222 through 228.

Figure 3:
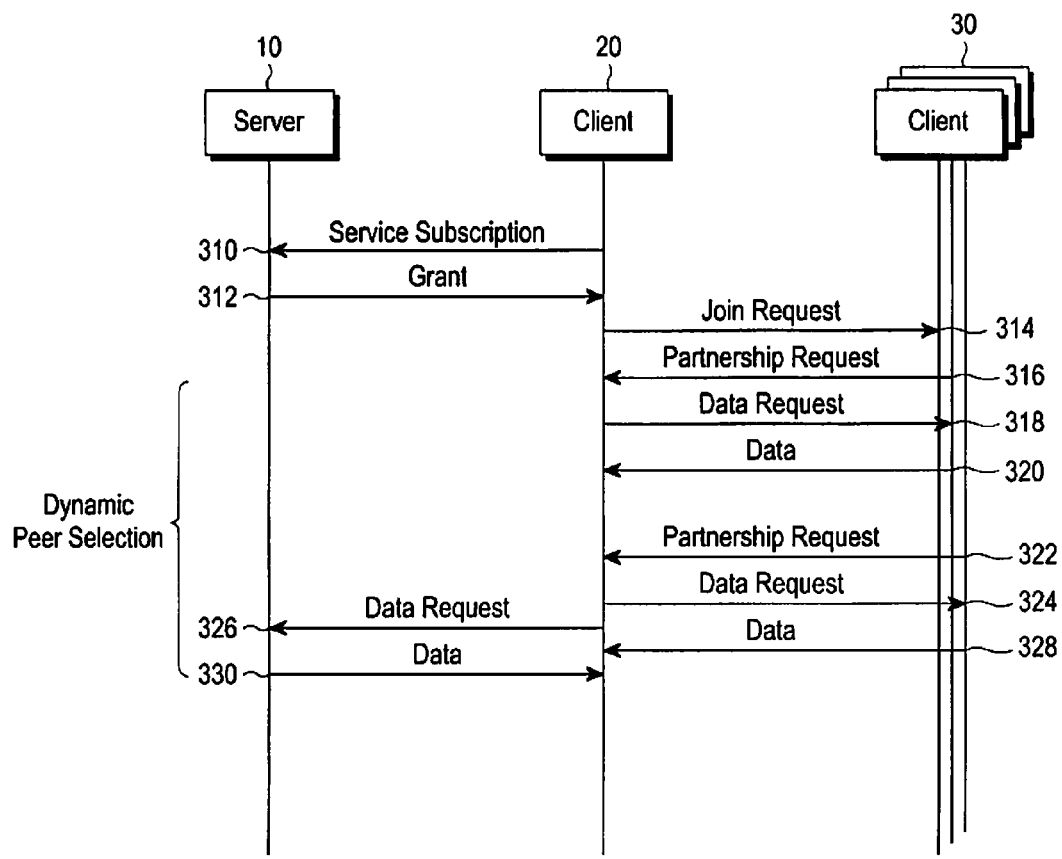
FIG. 3 shows a procedure for providing an adaptive streaming service between a client and a client based on an MPEG file format according to an embodiment of the present invention.

FIG. 3 shows a procedure for providing an adaptive streaming service between a client and another client based on an MPEG file format according to an embodiment of the present invention.

Referring to FIG. 3, a client 20 which desires to be provided with digital media data corresponding to particular content (hereinafter, "target client") transmits a service subscription message requesting service of the particular content to the server 10 in step 310.

The server 10, upon receiving the service subscription message, performs an authentication procedure with respect to the target client 20, to determine whether the service of the particular content to the client 20 is granted. If so, the server 10 transmits a grant message to the target client 20 in step 312.

The server 10 may provide information necessary for an adaptive streaming service based on an MPEG file format to the target client 20 through the grant message. The information necessary for the adaptive streaming service is service description information, which may include an initial deputy node, a service id, a chunk size, and a number of chunks, and additionally includes contents service name information, authentication information, a supported playback rate, a current play time, server info, and capacity constraints.

Figure 5:
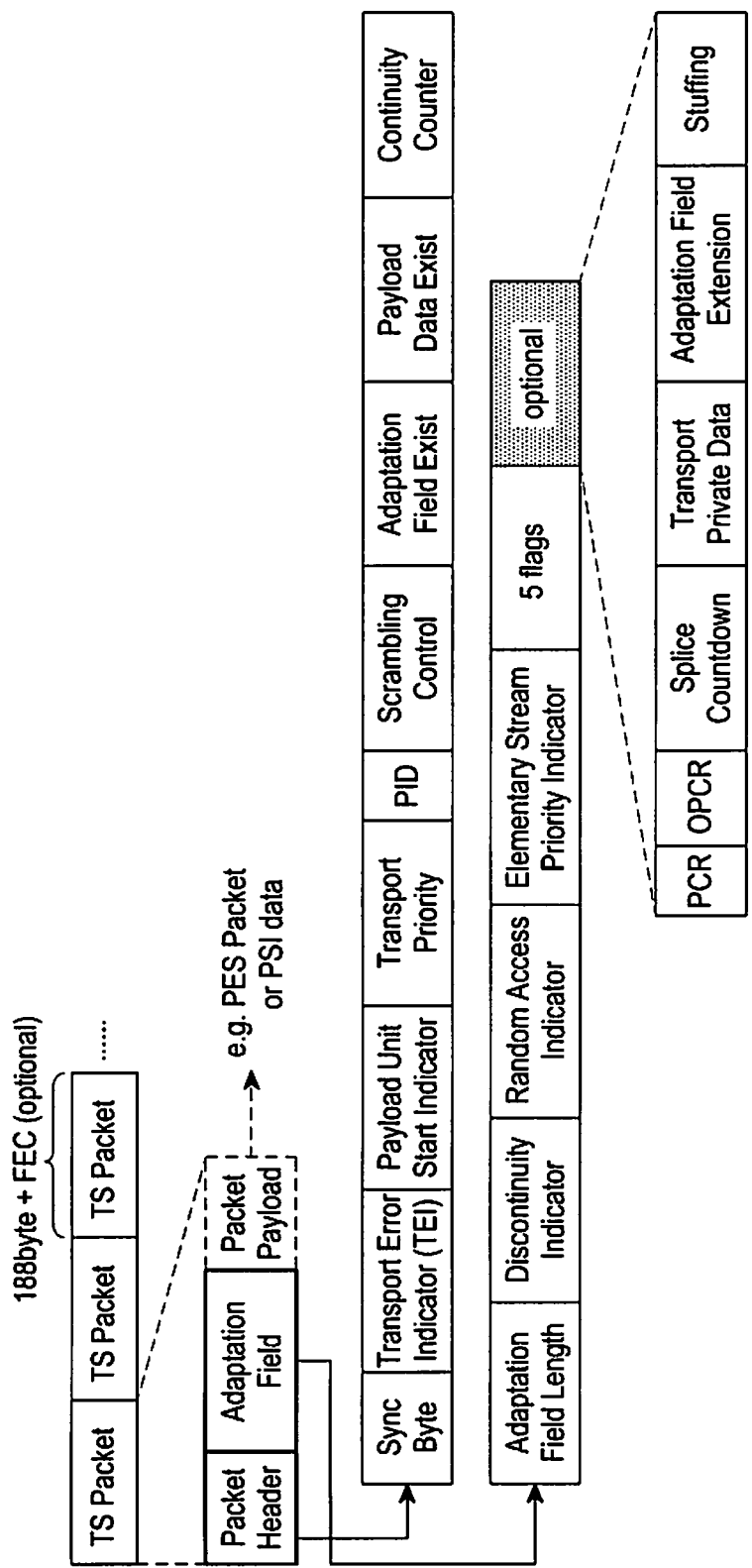
FIG. 5 shows a Transport Stream (TS) file format defined in MPEG-2 transport standard to transmit information newly defined according to an embodiment of the present invention.

For example, based on the TS file format defined in an MPEG-2 transport standard, as shown in FIG. 5, a grant packet which is a control message including service detailed information is transmitted through an MPEG-2 TS Program Specific Information (PSI) format.

Figure 6:
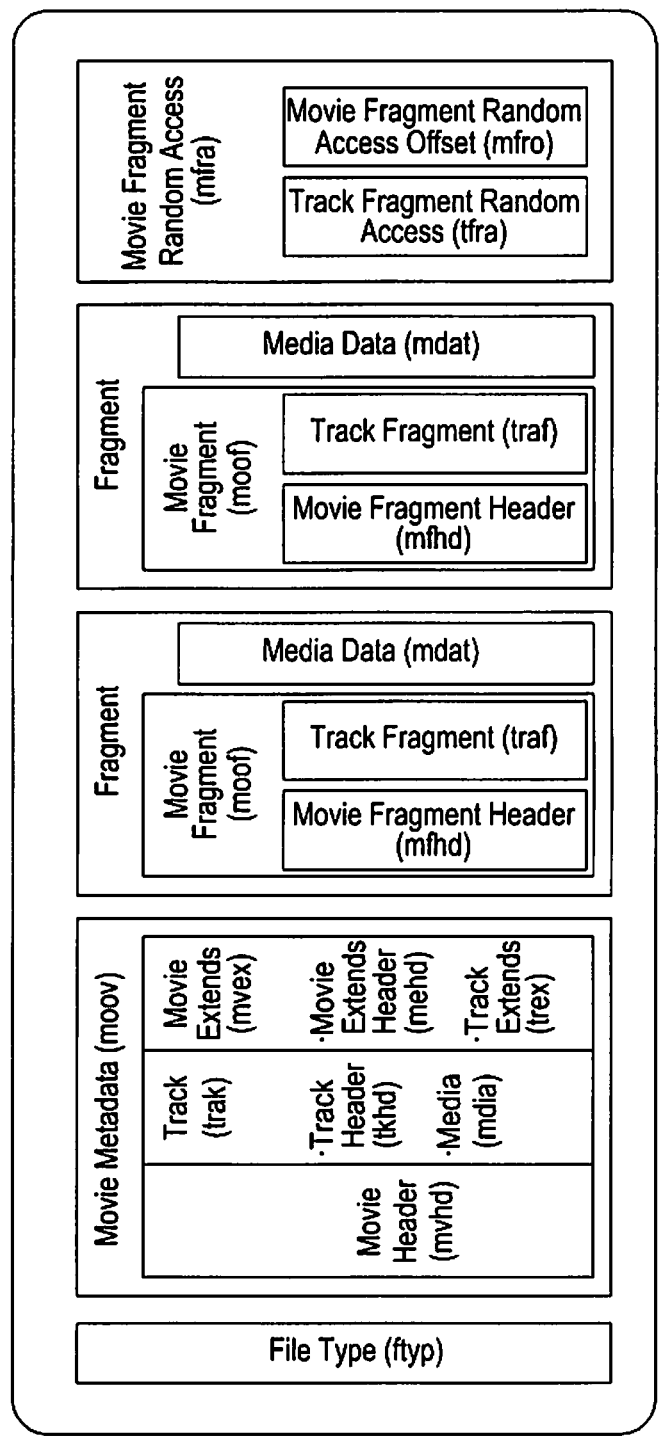
FIGS. 6 and 7 illustrate a file format defined in MPEG-4 transport standard to transmit information newly defined according to an embodiment of the present invention.
Figure 7:
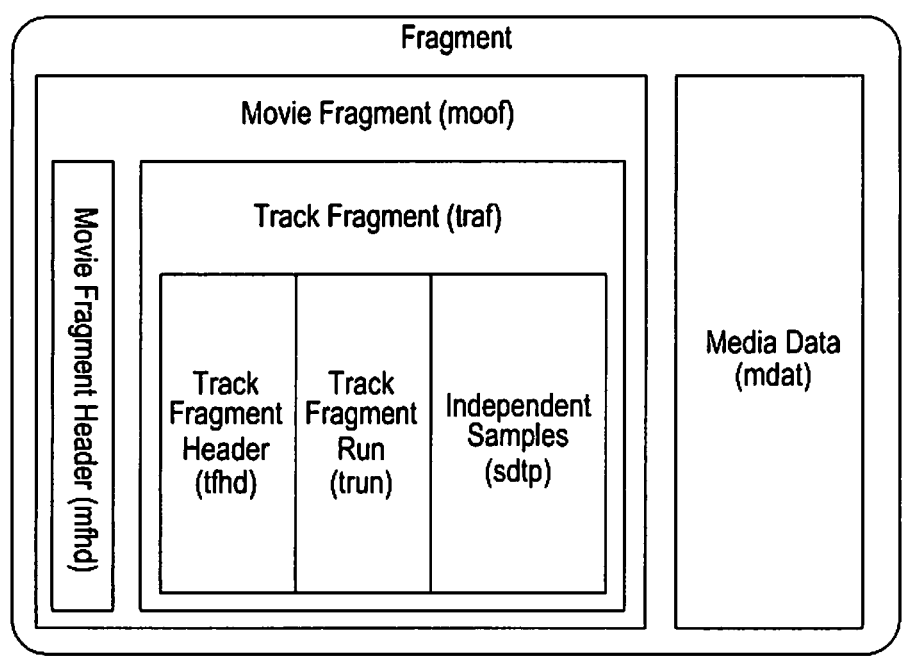

Based on a file format defined in an MPEG-4 transport standard, as shown in FIGS. 6 and 7, the grant packet may be transmitted through movie metadata, forming the file format defined by the MPEG-4 transport standard.

Once the service of the particular content is granted by the server 10, the target client 20 transmits a join request for receiving the digital media data corresponding to the particular content to at least one neighboring client 30 (hereinafter "neighboring client") in step 314. To this end, the target client 20 separately manages information about the neighboring client 30. That is, the target client 20 manages information about the neighboring client 30 by using a partnership list and a membership list. Herein, the membership list means a set of clients capable of providing digital media data at the request of the target client 20, and the partnership list means a set of clients likely to form a membership later.

The partnership list may be updated through periodic exchange of buffer maps with another client having an existing partnership. For example, information about partners may be changed among member nodes provided by a membership management protocol of a Peer-to-Peer (P2P) protocol, taking account of network conditions, bandwidth requirements, and so forth.

If necessary, the membership list may be updated by forming a membership with a client having the partnership.

The neighboring client 30 receiving the join request message from the target client 20 delivers a partnership request message to the target client 20 in step 316, thus granting transmission of the requested digital media data.

The neighboring client 30 may provide information necessary for the adaptive streaming service based on the MPEG file format to the target client 20 through the partnership request message. The information necessary for the adaptive streaming service based on the MPEG file format may include the buffer map, the membership list and a service id as metadata information of neighboring peer nodes, and additionally server info, capacity constraints, a number of partner nodes, a push/pull hybrid enable option, push/pull modulation information, a push/pull hybrid time duration, a latency, distance, a supporting playback rate.

For example, based on a TS file format defined in MPEG-2 transport standard as shown in FIG. 5, a partnership request packet, a control message including the metadata information of the neighboring peer nodes, is transmitted through an MPEG-2 TS PSI format.

Based on a file format defined in the MPEG-4 transport standard, as shown in FIGS. 6 and 7, the partnership request packet is transmitted through a movie fragment forming the file format defined in the MPEG-4 transport standard.

The target client 20 transmits a data request message requesting transmission of digital media data corresponding to the content granted by the server 10 to the neighboring client 30 having received the partnership request message in step 318.

The neighboring client 30, upon receiving the data request message, transmits at least one data chunk requested to be provided among data chunks acquired by dividing the digital media data to the target client 20 in step 320.

The neighboring client 30 may additionally piggyback information to be used for subsequent data request in transmission of the data chunk, and provide the information to the target client 20. The information to be used for subsequent data request may include the buffer map, the membership list and a service id as metadata information of neighboring peer nodes, and, in addition, server info, capacity constraints, a number of partner nodes, a push/pull hybrid enable option, push/pull modulation information, a push/pull hybrid time duration, a latency, distance, a supporting playback rate.

To reduce data request overhead, a push/pull hybrid scheme may be applied in which data chunks having predetermined intervals can be continuously received during a predetermined time after data chunks requested for data. For example, if the modulation for push service is four and a node pulls data from 4 different nodes, a delay can be reduced so that, after a first data chunk for a node A is requested and a second data chunk for a node B is requested, fifth, ninth, and thirteenth data chunks are continuously transmitted from the node A, and sixth, tenth, and fourteenth data chunks are continuously transmitted from the node B for a predetermined time without separately transmitting requests.

For example, based on the TS file format defined in MPEG-2 transport standard as show in FIG. 5, a data packet including data to be used for subsequent data request is transmitted through an MPEG-2 TS PES format.

Based on the file format defined in the MPEG-4 transport standard, as shown in FIGS. 6 and 7, a data packet including data to be used for subsequent data request is transmitted through media data (mdat) forming the file format defined in the MPEG-4 transport standard.

If digital media data has been coded in a format using Scalable Vector Coding (SVC) for adaptive streaming, the quality of media can be improved by requesting an additional data chunk in peer selection. If storage for received digital media data is required, a data chunk of a desired storage rate may be additionally received through P2P after reproduction, or for SVC, content of a desired storage rate may be acquired by requesting and receiving a data chunk in a necessary layer.

In this way, transmission of digital media data using the adaptive streaming scheme may be repeated between the target client 20 and the neighboring client 30 in steps 322, 324, and 328 of FIG. 3.

Meanwhile, the target client 20 may transmit a data request message requesting transmission of the requested data chunks to the server 10 if necessary in step 326, and the server 10 then may transmit the requested data chunks to the target client 20 in response to the data request message in step 330.

Although not mentioned in the foregoing description, messages transmitted and received between the server 10 and the target client 20 and messages transmitted and received between the neighboring client 30 and the target client 20 may use the file format defined in MPEG-2 or MPEG-4 transport standards. The file format defined in the MPEG-2 or MPEG-4 transport standards used herein includes information newly defined for an embodiment of the present invention, as will be described below.

Figure 4:
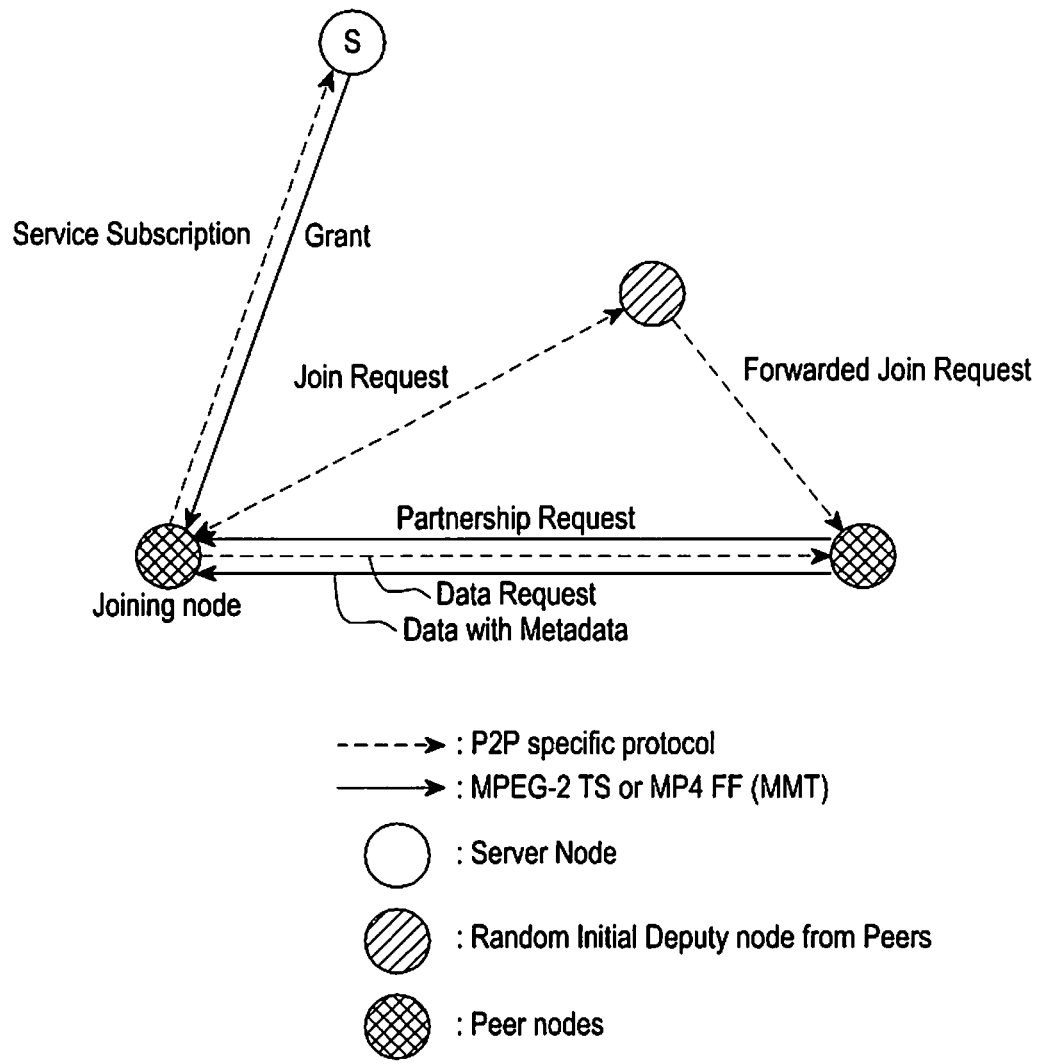
FIG. 4 shows an example of a procedure for providing an adaptive streaming service between a client and a client based on an MPEG file format according to an embodiment of the present invention.

FIG. 4 shows an example of a procedure for providing an adaptive streaming service between a client and a client based on an MPEG file format according to an embodiment of the present invention.

Referring to FIG. 4, a joining node transmits a service subscription message to a server node, which then provides a grant message to the joining node in response to the service subscription message.

The joining node transmits a join request message to a random initial deputy node selected from neighboring nodes, and the initial deputy node forwards the join request message to its neighboring nodes. Among the neighboring nodes having received the join request message forwarded by the initial deputy node, at least one neighboring node which desires to form a partnership with the joining node transmits a partnership request message to the joining node and provides data to the joining node together with metadata when receiving a data request message from the joining node.

In FIG. 4, procedures marked with dotted lines comply with a P2P protocol and procedures marked with bold lines are based on MPEG-2 TS or MPEG-4 file format for MPEG Media Transport (MMT). The neighboring nodes transmitting the partnership request message to the joining node are referred to as peer nodes. The server node may be a content delivery network edge server.

Figure 8:
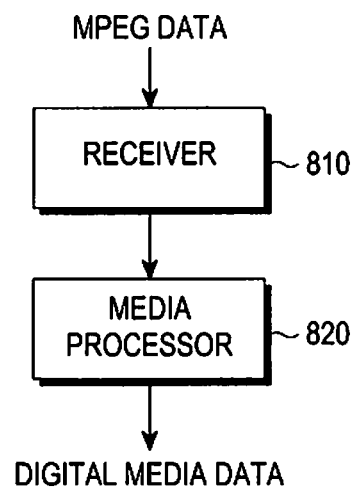
FIG. 8 illustrates a client receiving digital media data according to an embodiment of the present invention.

FIG. 8 illustrates a client receiving digital media data according to an embodiment of the present invention.

Referring to FIG. 8, a receiver 810 receives MPEG data corresponding to a content service requested by at least one server or at least one other client device determined according to a condition of a data communication network. The MPEG data is based on an MPEG file format, and may be a data chunk having a predetermined size for application of an adaptive streaming scheme.

The MPEG data based on the MPEG file format additionally includes information necessary for receiving digital media data from the at least one other client device and processing the received digital media data.

A media processor 820 processes the MPEG data received by the receiver 810 according to a predetermined scheme, and outputs digital media data acquired by the processing.

Figure 9:
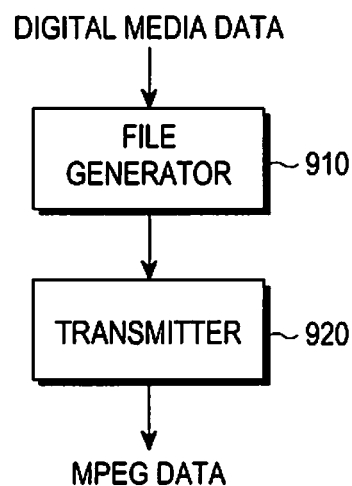
FIG. 9 illustrates a server or client for transmitting digital media data according to an embodiment of the present invention.

FIG. 9 illustrates a server or client for transmitting digital media data according to an embodiment of the present invention.

Referring to FIG. 9, a file generator 910 generates an MPEG file from digital media data corresponding to a content service requested by at least one other client device based on an MPEG file format.

The MPEG file based on the MPEG file format additionally includes information required for the at least one other client device to receive and process the digital media data.

A transmitter 920 transmits the MPEG file generated by the file generator 910 according to the adaptive streaming scheme.

As described above, the embodiment of the present invention defines a file format capable of supporting P2P to allow peer-assisted adaptive streaming as well as server-client adaptive streaming, when compared to an MPEG-4 file format technique for supporting a server-client adaptive streaming service using a conventional Hypertext Transfer Protocol (HTTP), in an MPEG system in relation to MMT establishing a new transmission standard of MPEG. In addition, MPEG-2 TS and MPEG-4 file formats capable of supporting various types of protocols including the HTTP are defined. That is, all P2P-based adaptive streaming services using the HTTP and a P2P protocol as well as a Real-Time Protocol (RTP), a Transmission Control Protocol (TCP), and a User Datagram Protocol (UDP) can be supported.

Based on the foregoing, procedures for providing P2P and server-client adaptive streaming services are provided, to be applied to both a live adaptive streaming service and a Video-on-Demand (VoD) service using the P2P technology. The technique proposed in the present invention may also be applied to most Information Technology (IT) products, such as TVs and Set-Top Boxes (STBs) supporting MP3P.

As can be anticipated from the foregoing description, by allowing transmission/reception of digital media data between clients based on the MPEG file format, users can acquire digital media data of requested content in a fast and convenient way.

Moreover, in the present invention, unlike in an HTTP-based server-client adaptive streaming service, information included in a file format is defined to allow adaptive reception of data from peers having necessary data among neighboring clients as well as from a server. Accordingly, by using the defined information, the P2P peer-assisted streaming/VoD services can be provided through various types of protocols, thereby supporting P2P with the additional information without departing very far from the conventional HTTP adaptive streaming procedure.

While the present invention has been shown and described with reference to certain embodiments thereof, it will be understood by those skilled in the art that various changes in form and details may be made therein without departing from the spirit and scope of the invention as defined by the appended claims. Accordingly, the scope of the invention is not to be limited by the above embodiment but by the claims and the equivalents thereof.

For example, the description about the embodiment of the present invention has been made based on the adaptive streaming scheme. However, the adaptive streaming scheme is an example of the streaming scheme. Therefore, it will be obvious that constructions and operations proposed in the embodiment of the present invention are also applicable to the streaming scheme in the same manner.

When the embodiment of the present invention is applied to the streaming scheme, unique characteristics of the adaptive streaming scheme may not be considered. That is, it is not necessary to divide digital media data into data chunks for various transfer rates.

What is claimed is:

1. A method for receiving digital media data in a client device, the method comprising:
    receiving, from a server, service description information required for a streaming service of a particular content;
    detecting an initial client device of neighboring client devices based on the service description information;
    transmitting, to the initial client device, a join request message to be forwarded from the initial client device to the neighboring client devices;
    receiving, from one of the neighboring client devices, a partnership request message including information on client devices capable of providing digital media data for the particular content;
    requesting, to at least one target client device detected based on the information on client devices, the digital media data; and
    receiving, from the at least one target client device, the digital media data,
    wherein the digital media data is included in a packetized elementary stream (PES) according to a moving picture experts group (MPEG)-2 transport format, or a movie fragment according to an MPEG-4 transport format.

2. The method of claim 1, wherein the service description information and the partnership request message are included in a movie metadata field according to the MPEG-4 transport format, or a control message according to the MPEG-4 transport format.

3. The method of claim 1, wherein the service description information includes a service identifier (ID), a data chunk size, a number of data chunks, and at least one of content information, authentication information, a supported playback rate, a current play time, server information and capacity constraints.

4. The method of claim 1, wherein the partnership request message includes buffer map information, a service identifier (ID), and at least one of server information, capacity constraints, a number of client devices likely to form a membership, a supported playback rate, latency information, distance information, a push/pull hybrid enable option, push/pull modulation information, and a push/pull hybrid time duration.

5. The method of claim 1, further comprising:
receiving, from the at least one target client device, piggyback information to be used for a subsequent data request.

6. The method of claim 1, wherein the neighboring client devices are periodically changed based on at least one of a network environment and a bandwidth requirement.

7. The method of claim 1, wherein receiving the digital media data comprises continuously receiving data chunks for the digital media data during a predetermined time, after requesting of the digital media data.

8. A client device for receiving digital media data, the client device comprising:
a transmitter;
a receiver configured to receive, from a server, service description information required for a streaming service of a particular content; and
a controller configured to detect an initial client device of neighboring client devices based on the service description information, control the transmitter to transmits, to the initial client device, a join request message to be forwarded from the initial client device to the neighboring client devices, when a partnership request message, including information on client devices capable of providing digital media data for the particular content, is received from one of the neighboring client devices, request, to at least one target client device detected based on the information on client devices, the digital media data, and receiving, from the at least one target client device, the digital media data by controlling the receiver,
wherein the digital media data is included in a packetized elementary stream (PES) according to a moving picture experts group (MPEG)-2 transport format, or a movie fragment according to an MPEG-4 transport format.

9. The client device of claim 8, wherein the service description information and the partnership request message are included in a movie metadata field according to the MPEG-4 transport format, or a control message according to the MPEG-4 transport format.

10. The client device of claim 8, wherein the service description information includes a service identifier (ID), a data chunk size, a number or data chunks, and at least one of content information, authentication information, a supported playback rate, a current play time, server information and capacity constraints.

11. The client device of claim 8, wherein the partnership request message includes at least one of buffer map information, a service identifier (ID), and at least one of server information, capacity constraints, a number of client devices likely to form a membership, a supported playback rate, latency information, distance information, a push/pull hybrid enable option, push/pull modulation information, and a push/pull hybrid time duration.

12. The client device of claim 8, further comprising:
receiving, from the at least one target client device, piggyback information to be used for a subsequent data request.

13. The client device of claim 8, wherein the neighboring client devices are periodically changed based on at least one of a network environment and a bandwidth requirement.

14. The client device of claim 8, wherein the receiver continuously receives data chunks for the digital media data during a predetermined time, after requesting of the digital media data.

* * * * *